United States Patent
Kawai et al.

(10) Patent No.: US 6,488,207 B1
(45) Date of Patent: Dec. 3, 2002

(54) BAR CODE READER, SCALING DEVICE AND SCALING METHOD

(75) Inventors: Hiroaki Kawai, Kawasaki (JP); Isao Iwaguchi, Kawasaki (JP); Mitsuo Watanabe, Kawasaki (JP); Kozo Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/473,987

(22) Filed: Dec. 29, 1999

(30) Foreign Application Priority Data

Jun. 4, 1999 (JP) .......................................... 11-158059

(51) Int. Cl.[7] .............................................. G06K 15/00
(52) U.S. Cl. .................. 235/383; 235/385; 235/462.01; 235/462.14; 705/16; 705/23; 705/414
(58) Field of Search ................................. 235/383, 385, 235/462.01, 462.11, 375, 462.14; 177/4, 32, 25, 164, 224; 705/16, 23, 407, 414, 416

(56) References Cited

U.S. PATENT DOCUMENTS

| | | | | |
|---|---|---|---|---|
| 3,737,631 A | * | 6/1973 | Harris .................... | 235/61.6 R |
| 3,836,755 A | * | 9/1974 | Ehrat ..................... | 235/61.7 R |
| 3,951,221 A | * | 4/1976 | Rock ..................... | 177/1 |
| 3,986,012 A | * | 10/1976 | Loshbough et al. ........ | 177/165 |
| 4,036,316 A | * | 7/1977 | Rock ..................... | 177/1 |
| 4,063,604 A | * | 12/1977 | Rock ..................... | 177/1 |
| 4,108,363 A | * | 8/1978 | Susumu .................. | 235/383 |
| 4,139,070 A | * | 2/1979 | Hanson et al. ............. | 177/200 |
| 4,241,407 A | * | 12/1980 | Sookikian et al. ......... | 177/25.13 |
| 4,398,253 A | * | 8/1983 | Karp et al. .............. | 177/25.15 |
| 4,716,281 A | * | 12/1987 | Amacher et al. ........... | 235/383 |
| 5,086,879 A | * | 2/1992 | Latimer et al. ............. | 235/383 |
| 5,724,267 A | * | 3/1998 | Richards .................. | 177/164 |
| 5,967,264 A | * | 10/1999 | Lutz et al. ................ | 235/383 |

* cited by examiner

*Primary Examiner*—Michael G. Lee
*Assistant Examiner*—Uyen-Chau N. Le
(74) *Attorney, Agent, or Firm*—Armstrong, Westerman & Hattori, LLP (57) ABSTRACT

A bar code reader includes bar code processing units (10, 11) for generating a bright/dark pattern forming a bar code (40) by optically scanning a bar code forming surface of an object (4), converting into plural categories of module values indicating widths of the respective areas, and demodulating the bar code into character data, a scaling unit for creating scale data by scaling a weight of the object to be sold by weight, a adjustment control unit (11) to perform zero-setting in response to a request for initializing the scaling unit, and a weight change detecting unit (11) for judging at least one of an increment change and a decrement change from zero in weight, and making a corresponding piece of scale data visibly displayed when in the increment change and making an absolute value of a corresponding piece of scale data visibly displayed when in the decrement change.

11 Claims, 5 Drawing Sheets

BAR CODE READER, SCALING DEVICE AND SCALING METHOD

BACKGROUND OF THE INVENTION

The present invention relates to a bar code reader for reading a bar code by irradiating the bar code with laser beams and detecting a change in intensity of reflected laser beams, and demodulating the bar code into character data. The present invention relates more particularly to a bar code reader and a scaling device which incorporate a scaling function, and to a scaling method.

As typified by a POS (Point of Sales) system in a distribution sector over the recent years, it has been generalized that the merchandises are managed by bar codes. For instance, according to the POS system in a shop, pieces of data such as categories and sales prices of the goods are coded in a bar code format, and printed or pasted onto the goods. Then, the bar code of the goods is read at a cash register in a payment location, whereby the number of goods sold is added up in real time as well as doing the payment of a charge. This serves for a stock management and a purchase management.

A bar code reader (a scanner device) for reading the bar code on the goods is roughly classified into a fixed type reader used for comparatively small goods formed with the bar codes, and a handy type reader used for comparatively large goods. The fixed type bar code reader thereof is provided with a mechanism (a scanning/converging optical system) for scanning the bar code in a multiplicity of directions by irradiating the bar code with light beams for reading so that an operator is capable of reading the bar code without being so aware of a bar code direction. More specifically, the bar code is scanned in the multiplicity of directions with the laser beams defined as reading irradiation light beams during a scan by one reflection surfaces of a polygon mirror used in combination with fixed reflection mirrors. Then, during such a scan process, the laser beams reflected from the surface of the goods are received, and a demodulation processing circuit (a control circuit) demodulates change-of-intensity data (reflected light data) of the thus received reflected laser beams with a demodulation algorithm for the bar code and extracts data coded into the bar code. Further, the fixed type bar code reader includes a scale function unit together with the scan function unit in order to enable the goods to be sold by weight.

In the prior art bar code reader, a scan/display panel of the scan function unit is provided with a start button (a switch) for shifting the scan function unit to a wake-up state (an operating state) and a sound adjusting button for adjusting a volume or a tone of the sound from a loudspeaker. Further, a scale-oriented display connected to the scale function unit is provided with a zero-adjusting button for making a zero-adjustment of the scale. Accordingly, the operator inevitably operates the button and the switch disposed in different positions on the scan/display panel and the scale-oriented display as the necessity may arise. Such a button operation in combination with the operation of reading the bar codes of a large quantity of goods might lead an increased load on the operator. Moreover, the zero-adjustment of the scale of the scale of the cal function unit is allowed to be done only before placing the goods. This is because if the zero-adjustment is made in a state where the goods remains placed, a weight thereof is displayed in minus when the goods is removed. In this case, the operator needs to re-execute the zero-adjustment after temporarily removing the goods, which might be a factor for increasing the load on the operator. Furthermore, with the construction that the zero-adjustment of the scale of the scan function unit is made only before placing the goods, it is unfeasible to cope with an operational mistake (a deviation in timing) of the operator.

SUMMARY OF THE INVENTION

Accordingly, it is a primary object of the present invention to provide a bar code reader and a scaling method which are capable of operating in one location a start button (a switch) for shifting a scan function unit to a wake-up state (an operating state) from a sleep state (non-operating state), a sound adjustment button for adjusting a volume or a tone of a sound from a loudspeaker, and a zero-adjustment button for performing a zero-adjustment of a scale of a scale function unit.

It is another object of the present invention to provide a bar code reader and a scaling method which are capable of integrating a variety of function buttons operable in one location, into one same button.

It is still another object of the present invention to provide a bar code reader, a scaling device and a scaling method which are capable of performing the zero-adjustment of the scale of the scale function unit even in a state where the goods is placed when selling the goods by weight.

It is a further object of the present invention to provide a bar code reader, a scaling device and a scaling method which are capable of preventing an operational mistake and an unfair operation by an operator when selling the goods by weight.

To accomplish the above objects, according to a first aspect of the present invention, a bar code reader comprises a bar code processing unit for generating a bright/dark pattern containing a plurality of bright areas and a plurality of dark areas forming a bar code by optically scanning a bar code forming surface of an object, converting the bright/dark pattern into plural categories of module values indicating widths of the respective bright areas and widths of the respective dark areas, and demodulating the bar code into character data, a scaling unit for creating scale data by scaling a weight of the object, a zero-adjustment control unit for working a weight scaling function of the scaling unit to perform zero-setting in response to a request for initializing the scaling unit, and a weight change judging unit for judging at least one of an increment change and a decrement change from zero in weight on the basis of the scale data created by the scaling unit, and outputting a corresponding piece of scale data when in the increment change and an absolute value of a corresponding piece of scale data when in the decrement change.

The bar code reader taking this construction may further comprise an automatic zero-adjustment control unit for forcibly working the weight scaling function of the scaling unit to perform the zero-setting when the weight change judging unit judges the decrement change and outputs the absolute value of the scale data.

Further, a box body of the bar code reader incorporates a first switch element for enabling an operator to input the request for initializing the scaling unit, and a second switch element for enabling the operator to start up another processing function containing control for changing any one of a volume and a tone of a confirmation sound emitted from a loudspeaker when the bar code processing unit reads the bar code.

The bar code reader of the present invention may take such a configuration that the first switch unit and the second switch unit are integrated into one same switch unit.

In this configuration, the bar code reader may further comprise a selecting unit for starting up a corresponding processing function when any one of the first and second switch elements is operated corresponding to the number of operations of the integrated switch element.

Moreover, the bar code reader may further comprise a selecting unit for starting up a corresponding processing function when any one of the first and second switch elements is operated corresponding to an operation continuous time of the integrated switch element.

According to a second aspect of the present invention, a scaling device comprises a unit for comparing a weight of an object at a first point of time with a weight of the object at a second point of time posterior to the first point of time, and a unit for outputting, when there occurs a decrement change in weight as a result of the comparison, scale data with plus and minus of the change being reversed.

According to a third aspect of the present invention, a scaling device comprises a unit for comparing a weight of an object at a first point of time with a weight of the object at a second point of time posterior to the first point of time, and a unit for outputting, when there occurs a decrement change in weight as a result of the comparison, scale data corresponding to an absolute value of the change.

According to a fourth aspect of the present invention, a scaling device comprises a unit for comparing a weight of an object at a first point of time with a weight of the object at a second point of time posterior to the first point of time, and a unit for automatically setting, when there occurs a decrement change in weight as a result of the comparison, the weight of the object at the second point of time to zero.

According to a fifth aspect of the present invention, a scaling method comprises a step of creating scale data by scaling a weight of an object by a zero-set scaling device, a step of judging at least one of an increment change and a decrement change from zero in weight on the basis of the created scale data, a step of outputting a corresponding piece of scale data when in the increment change, and a step of outputting an absolute value of a corresponding piece of scale data when in the decrement change.

This scaling method may further comprise a step of selecting a start-up of a processing function of making the scaling device perform zero-setting, and a start-up of another processing function containing control for changing any one of a volume and a tone of a confirmation sound emitted from a loudspeaker when reading the bar code, corresponding to a difference between operation methods of one same switch unit.

According to the bar code reader, the scaling device and the scaling method of the present invention which take the above configurations, it is possible to prevent a payment from not being normally made due to an operational mistake and an unfair operation by an operator such as a case of selling the goods by weight.

Further, the zero-adjustment of the scale of the scale function unit can be carried out even in a state where the goods remains placed such as the case of selling the goods by weight, and hence a load on the operation can be reduced.

Moreover, it is feasible to operate in one location switch elements such as a start button (a switch) for shifting a scan function unit to a wake-up state (an operating state) from a sleep state (non-operating state), a sound adjustment button for adjusting a volume or a tone of a sound from a loudspeaker, and a zero-adjustment button for performing a zero-adjustment of the scaling unite, whereby the load on the operator can be decreased.

In addition, the variety of function buttons operable in one location can be integrated into one same switch element, and the load on the operator can be further reduced.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

<Construction of Bar Code Reader>

Figure 1:
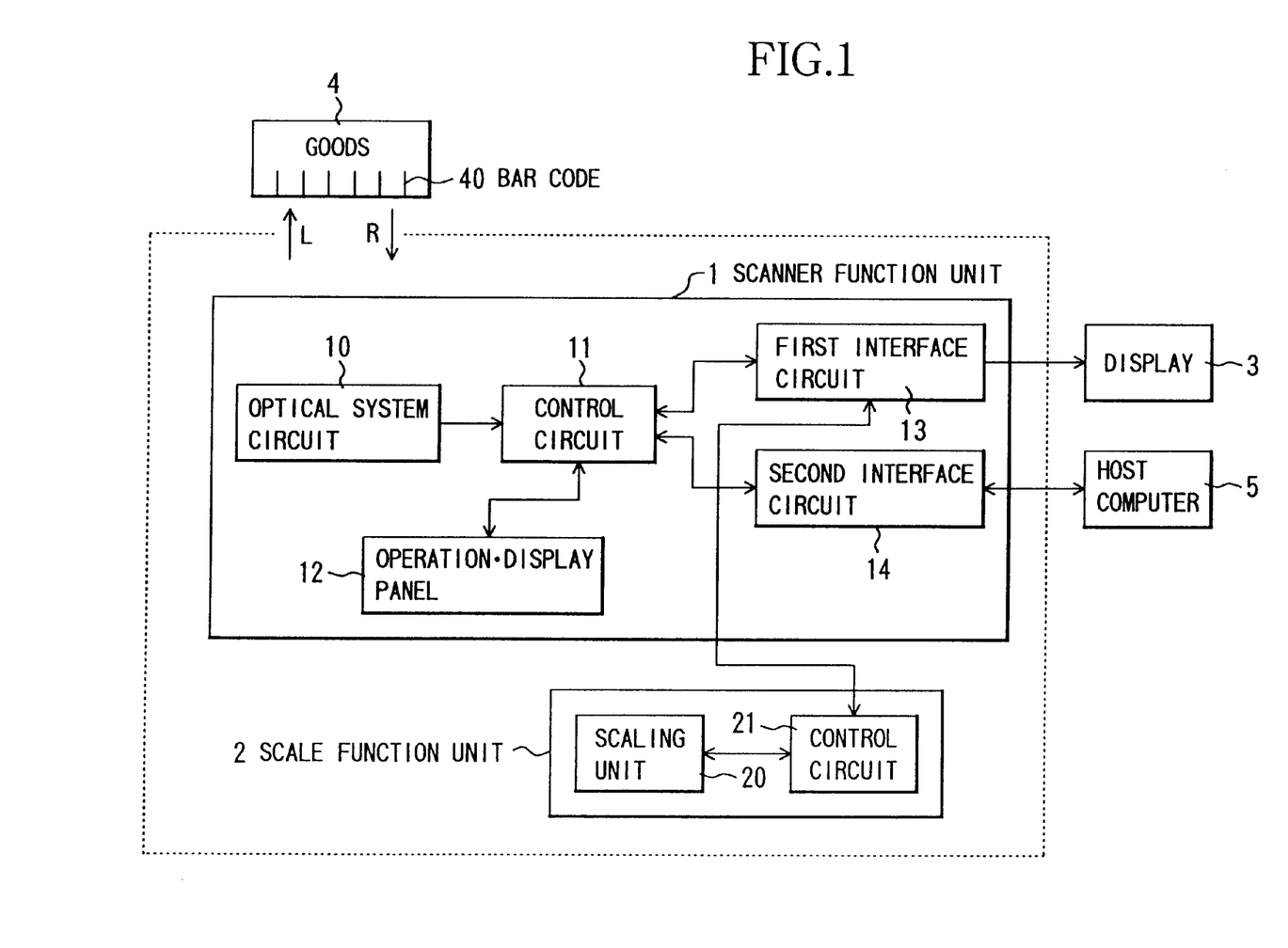
FIG. 1 is a block diagram showing a construction of a bar code reader in one embodiment of the present invention.

FIG. 1 shows a construction of a bar code reader in one embodiment of the present invention. Referring to FIG. 1, the bar code reader includes a scanner function unit 1 and a scale function unit 2, which are connected to a scale-oriented display 3 and a host computer (e.g., a POS terminal) 5.

(Scanner Function Unit)

The scanner function unit 1 is constructed of an optical system circuit 10, a control circuit 11, an operation/display panel 12, a first interface circuit 13 and a second interface circuit 14. The optical system circuit 10 has a laser light source for emitting a laser beam L. The laser beam L emitted from the laser light source is incident upon a scanning/converging optical system. The scanning/converging optical system has a polygon mirror for deflecting the laser beam L, and a plurality of fixed mirrors for reflecting the deflected laser beam L in a plurality of directions. In the scanning/converging optical system 2, the laser beams L are emitted for consecutive scanning in the plurality of directions upwards of the scanning/converging optical system 2, within a period of the deflection by one reflection surface of the polygon mirror. When the thus scanning laser beams L impinge upon a surface of a goods 4, the laser beams L are irregularly reflected from the surface thereof, and some of reflected laser beams R travel back to the scanning/converging optical system. In the optical system circuit 10, the scanning/converging optical system inputs the reflected laser beams R to a photo detector. The photo detector is classified as a photo diode covered with a filter which transmits only the light having the same wavelength as that of the laser beam L (the reflected laser beam R), and outputs an electric current corresponding to a change in intensity of the reflected laser beam R.

A control circuit 11 disposed posterior to the optical system circuit 10 includes, though not illustrated, a CPU for executing programs relative to a scaling process, a zero adjusting process by a scale unit and a wake-up process which will hereinafter be explained, and, in addition, a bar code recognizing/demodulating circuit. A differentiating circuit contained in the control circuit 11 outputs to a binarizing circuit a differential signal (precisely, a voltage signal of a single differentiation) having an amplitude corresponding to a current signal level at a rising point and a falling point of the current signal corresponding to a change in intensity of the reflected laser beam R which is outputted from the photo detector, i.e., at a point of change from a black bar (a dark area) to a white bar (a bright area) of a bar code (including a margin) and at a point of change from the white bar to the black bar thereof. The binarizing circuit compares the differential signal given from the differentiating circuit with first and second slice levels given from a slice level generating circuit. The binarizing circuit, when the amplitude of the differential signal exceeds the first slice level, outputs a white edge pulse (WEG) indicating the point of change (a white edge) from the black bar to the white bar of the bar code and, when the amplitude of the differential signal exceeds the second slice level, outputs a black edge pulse (BEG) indicating the point of change (a black edge) from the white bar to the black bar of the bar code.

The slice level generating circuit included in the control circuit 11 generates voltage signals assuming the first and second slice levels, which are inputted to the binarizing circuit. The first slice level is defined as a plus (+) level threshold value for detecting the white edge in the binarizing circuit, while the second slice level is defined as a minus (−) level threshold value for detecting the black edge. The slice level generating circuit, which obtains a peak hold of the differential signal outputted from the differentiating circuit, variably sets, when the amplitude of the differential signal is large, the first and second slice levels corresponding to this amplitude and, when the amplitude of the differential signal is small, operates to fix the first and second slice levels at a predetermined level.

Further, a bar width counter included in the control circuit 11, based on white and black edge pulses inputted from the binarizing circuit, measures a period of time from a timing of the white edge pulse to a timing of the black edge pulse (which corresponds, it is expected, to a width of the white bar in the bar code 40), and a period of time from the timing of the black edge pule to the timing of the white edge pulse (which corresponds, it is expected, to a width of the black bar in the bar code 40). Then, the bar width counter counts the number of clock pulses for measuring periods of time corresponding to these bar widths, and outputs to a memory circuit bar width count values (BCD) indicating count values corresponding to those bar widths. The bar width counter, simultaneously with the outputting of these bar width count values, outputs to the memory circuit a color identifying signal (B/W) for indicating whether the bar is the black bar or the white bar.

The bar code recognizing/demodulating circuit included in the control circuit 11 is classified as a processor for executing a predetermined recognizing/demodulating process with respect to each of the bar width count values read from the memory circuit, and fetching various categories of character data coded into the bar codes 40.

Figure 2:
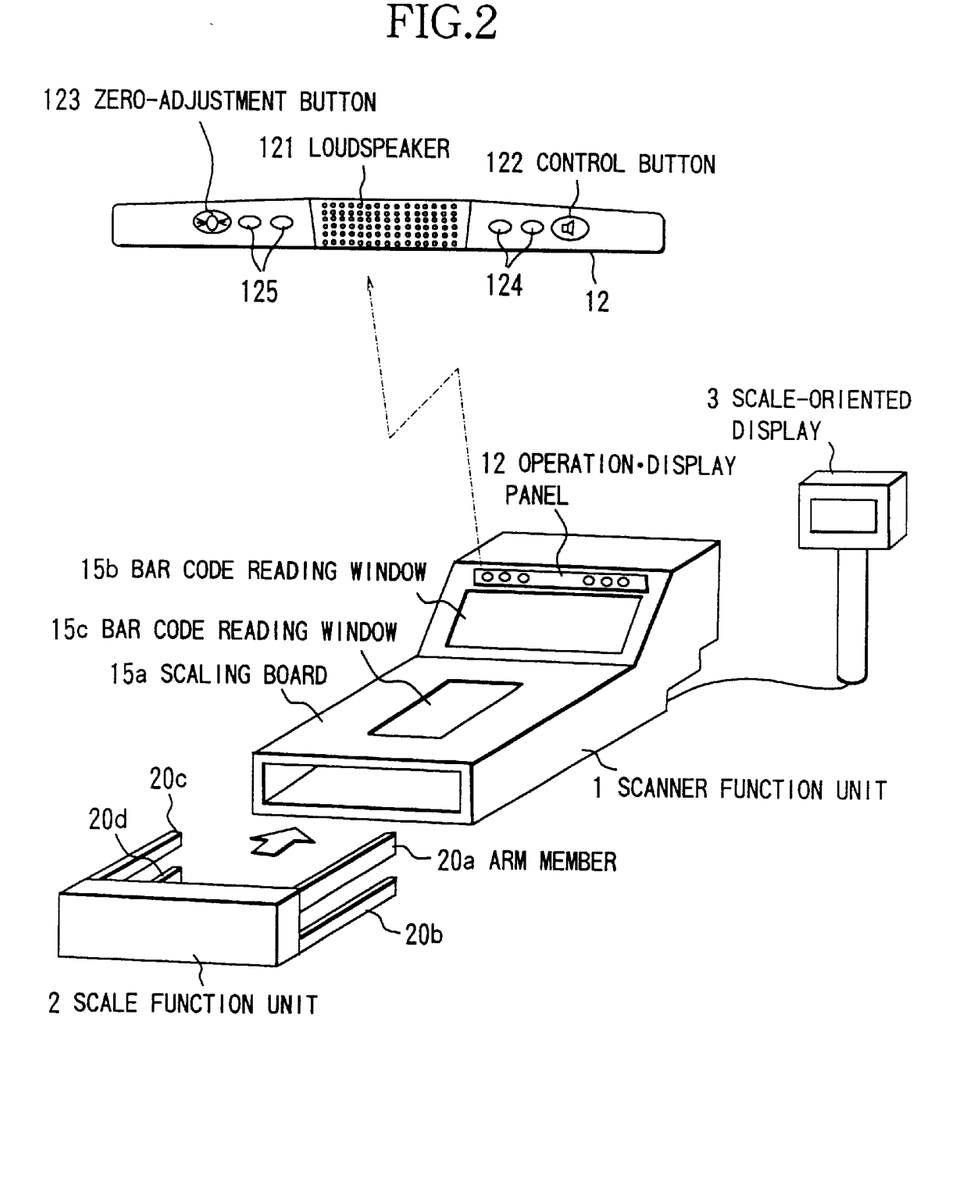
FIG. 2 is an exploded perspective view showing a physical architecture of the bar code reader in FIG. 1 and showing an operation/display panel in enlargement.

The operation/display panel 12 constituting the scanner function unit 1, of which a configuration is shown in details in FIG. 2, has a control button 122 serving as a start button (a switch) for shifting the scanner function unit 1 from a sleep status (a non-operating status) to a wake-up status )an operating status) and a tone adjusting button for adjusting a volume or a tone of a loudspeaker 121 for emitting a sound of confirmation when reading the bar code, and a zero adjusting button 123 for making a zero-adjustment of a scaling unit (a load-cell unit) of the scale function unit 2. The operation/display panel 12 further includes an object detection sensor 124 for detecting that the goods 4 formed with the bar code 40 is moved or placed in the vicinity of a bar code reading window, and a display element 125 for visibly displaying a variety of states.

The first interface circuit 13, based on the control given from the control circuit 11, visibly displays a piece of scale (weight) data etc transmitted from the scale function unit 2 on the scale-oriented display 3. Further, the first interface circuit 13 relays a transmitting/receiving command and the data between the control circuit 11 and a control circuit 21 of the scale function unit 2. The second interface circuit 14 relays a transmitting/receiving command and the data between the control circuit 11 and the host computer 5. The second interface circuit 14 is constructed of a universal asynchronous receiver/transmitter (UART).

(Scale Function Unit)

The scale function unit 2 is structured of a scaling unit (a load-cell unit) 20 and the control circuit 21. The scaling unit 20 is composed of a load-cell which is distorted corresponding to a weight of the goods 4 when the goods 4 to be scaled is placed on a scaling board (see FIG. 2) of the scanner function unit 1 in the case of selling the goods 4 by weight, and generates and outputs an electric signal corresponding to a quantity of distortion (weight). The control circuit 21 transmits and receives a variety of commands and scale data to and from the control circuit 11 via the first interface circuit 13 of the scanner function unit 1. The control circuit 21 controls the scaling unit 20 to scale the goods 4, and reads the scale data thereof.

(Scale-Oriented Display)

The scale-oriented display 3 visibly displays the scale data transmitted from the control circuit 21 and received by the control circuit 11 via the first interface circuit 13 of the scanner function unit 1.

(Structure of Bar Code Reader)

The bar code reader, of which the electrical configuration has been described in details referring to FIG. 1, takes a physical architecture as illustrated in FIG. 2. The operation/display panel 12 provided in the scanner function unit 1 is shown in enlargement. The scale-oriented display 3 is connected to the scanner function unit 1. Further, the scanner function unit 1 has a scale board 15a, and a bar code reading windows 15b, 15c. The scale board 15a is configured so that the goods 4 to be scaled can be placed thereon. A variety of circuits shown in FIG. 1 are built in a box body of the scanner function unit 1. The scale function unit 2 incorporating the scaling unit 20 and the control circuit 21 is connected to the scanner function unit 1. The scaling unit 20 is composed of the load-cell for, when the goods 4 to be scaled is placed on the scale board 15a of the scanner function unit 1, measuring a weight applied to four lengths of arm members 20a, 20b, 20c, 20d through the scale board 15a, converting the weight into an electric signal and outputting this signal.

The bar code reader illustrated in FIG. 2 has two reading windows, i.e., a reading window 15b substantially vertically provided, and a reading window 15c horizontally provided. Scan laser beams are emitted in the horizontal direction from the reading window 15 and upwards from reading window 15c, whereby the bar code can be read in a wide range.

<Operation of Bar Code Reader>

An operation of the bar code reader taking the construction described above will be explained in conjunction with FIGS. 1, 2, 3, 4 and 5.

(Scaling Process (1))

Figure 3:
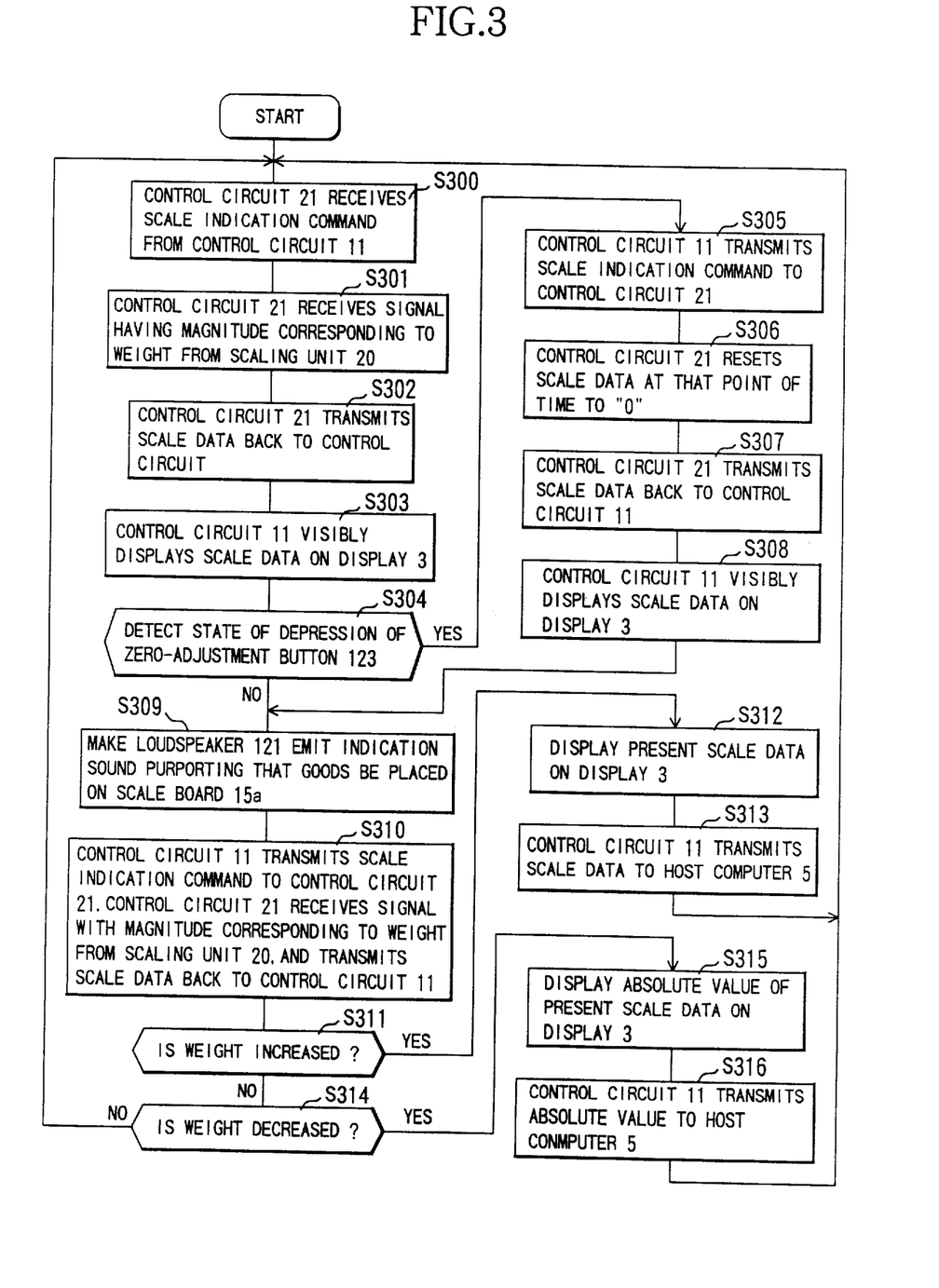
FIG. 3 is a flowchart showing a first scaling process in one embodiment of the present invention.

Given first is an explanation of a first scaling process when an operator switches ON a power supply of the bar code reader and sells the goods 4 by weight. Referring to FIGS. 1, 2 and 3 in combination, the control circuit 21 of the scale function unit 2 receives a scale indication command from the control circuit 11 of the scanner function unit 1 via the first interface circuit 13 (step S300). The control circuit 21, based on the scale indication command, starts up the scaling unit 20 and receives a signal having a magnitude corresponding to the weight from the scaling unit 20 (S301). The control circuit 21 generates a piece of scale data indicating a scale value based on the magnitude of this signal, and transmits this piece of data as response data back to the control circuit 11 (S302). On this occasion, if a zero-adjustment is properly made, the scale data becomes "0 gram".

The control circuit 11 receives the scale data transmitted from the control circuit 21 via the first interface circuit 13. The control circuit 11 visibly displays the received scale data on the scale-oriented display 3 through the first interface circuit 13 (S303).

The operator, when judging that the zero-adjustment by the scaling unit 20 is needed in this state, or when requested from a buyer, depresses the zero-adjustment button 12 of the operation/display panel 12. The control circuit 11, when detecting that the zero-adjustment button 123 has been depressed (S304), transmits a zero-adjustment indication command to the control circuit 21 via the first interface circuit 13 (S305).

The control circuit 21, based on this zero-adjustment indication command, resets the scale data at that point of time to "0" (S306). The control circuit 21 transmits this piece of scale data as response data back to the control circuit 11 (S307).

The control circuit 11 receives the scale data transmitted from the control circuit 21 via the first interface circuit 13. The control circuit 11 visibly displays the received scale data on the scale-oriented display 3 through the first interface circuit 13 (S308). As a result, "0 gram" is displayed on the display 3. Note that if some sort of abnormality occurs when performing the zero-adjustment in S306, the control circuit 11, based on the response data transmitted from the control circuit 21, judges a state of abnormality, then displays this state on the display 3, and executes a process in the event of the abnormal state.

The control circuit 11, when the zero-adjustment button 123 is not depressed in S304, or when the zero-adjusting process is completed in S308, controls the loudspeaker 121 of the operation/display panel 12 to emit an indication sound purporting that the goods 4 to be sold by weight be placed on the scale board 15a (S309). In a normal case, the operator places the goods 4 on the scale board 15a in accordance with this indication at that point of time.

Next, the control circuit 11 transmits the scale indication command to the control circuit 21 via the first interface circuit 13. The control circuit 21 starts up the scaling unit 20 on the basis of the scale indication command, and receives a signal having a magnitude corresponding to the weight from the scaling unit 20. The control circuit 21 generates a piece of scale data indicating the scale value based on the magnitude of this signal, and transmits this piece of data as response data back to the control circuit 11 (S310).

The control circuit 11 receives the scale data transmitted from the control circuit 21 via the first interface circuit 13. The just-anterior scale data is held for a predetermined period or till the weight might change and can be therefore compared with the present scale data. Then, the control circuit judges whether or not the present scale data received becomes larger than the just-anterior scale data (S311).

As a result, if the weight increases, the control circuit 11 displays the present scale data on the display 3 through the first interface circuit 13 (S312), thereafter transmits the same scale data to the host computer 5 via the second interface circuit 14, and loops back to the process in S300 (S313).

The operator confirms the scale indication on the display 3 and removes the goods 4 from the scale board 15a, and hence the control circuit 11 is capable of sequentially scaling the next goods 4 in accordance with steps S300 through S313 described above. A scaling mistake might happen with a deviation of the operation timing of the operator. For instance, normally after the operator has made the zero-adjustment, the goods 4 to be scaled is placed on the scale board 15. If the operator places the goods 4 on the scale board 15 and thereafter executes the zero-adjustment, however, it follows that the weight display is "0 gram" irrespective of the goods 4 being placed thereon, with the result that any increase in weight is not detected. As a consequence of this, it is unfeasible to carry out a normal collection of the charge.

This problem can be avoided by taking the following processing steps. To be specific, the control circuit 11, when judging in S311 that the weight does not increase, judges whether or not the present scale data becomes smaller than the just-anterior scale data (S314). When he goods 4 is removed from the scale board 15 after making the zero-adjustment, the weight decreases, however, this decrement indicates a net quantity of the goods 4. As a result, when the weight decreases, the control circuit 11 obtains an absolute value of the present scale data (gram is displayed in minus), and displays this value on the display 3 (S315). At the same time, the control circuit 11 transmits the absolute value scale data to the host computer via the second interface circuit 14, and loops back to the process in S300 (S316).

Incidentally, when the control circuit 11 judges in S314 that the weight does not decrease, it implies that there is no decrement in weight and that the goods 4 is not scaled, and the processing returns to step S300.

In the process in S313 or S316, the host computer, which has received the scale data displayed in gram corresponding to the weight from the control circuit 11, converts this piece of scale data into charge data (yen) based on the scale data and a price per unit weight of the goods 4 concerned, and visibly displays the charge data on an display (unillustrated) for displaying the charge. A price look-up table provided in the host computer 5 is stored with pieces of unit price data are stored together with information (goods code) for identifying the goods 4. When the bar code 40 of the goods 4 is read, this look-up table is referred to, and the unit price data is read.

It is possible to prevent the mistake in scaling that might occur due to the deviation of the operation timing of the operator and further prevent the goods 4 to be scaled from being unfairly removed before payment. Namely, the following three points might be conceived as factors for causing the change to decrement in weight. First, it occurs that the operator makes the zero-adjustment without being aware of the goods 4 remaining placed on the scale board 15, and thereafter removes the goods at a certain point of time. Second, it occurs that the operator becomes aware of a necessity for executing the zero-adjustment after placing the goods 4 on the scale board 15, then makes the zero-adjustment with the goods 4 remaining placed thereon, and thereafter removes the goods 4. Third, it occurs that the operator, based upon an unfair agreement with a customer, after placing the goods 4 on the scale board 15, makes the zero-adjustment and removes the goods 4 from the scale board 15. In this third case, when removing the goods 4, the weight displayed becomes smaller than a weight of the goods which will be scaled afterward, and an amount of payment for the goods 4 sold by weight is smaller than a normal amount of money.

(Scaling Process (2))

Figure 4:
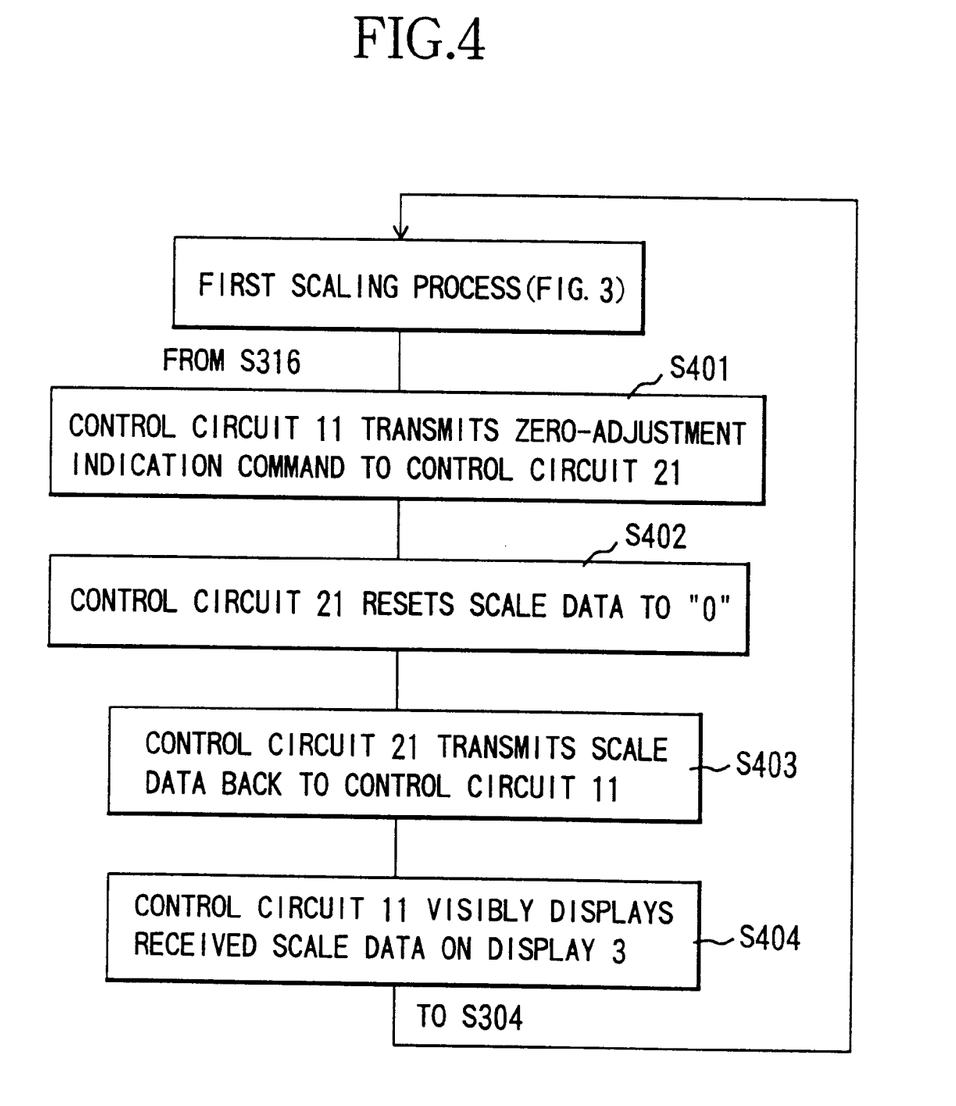
FIG. 4 is a flowchart showing a second scaling process in one embodiment of the present invention.

Next, a second scaling process when the operator switches ON the power supply of the bar code reader and selling the goods 4 by weight, will be described with reference to FIGS. 1, 2 and 4 in combination. According to the steps taken in the first scaling process discussed above, the control circuit 11, when judging in S314 that the weight decreases, visibly displays the absolute value scale data on the display 3 in S315, and transmits the scale data displayed in absolute value to the host computer 5 in S316.

In the second scaling process, after the absolute value of the scale data has been transmitted to the host computer 5, the zero-adjustment is carried out automatically (forcibly) in the scaling unit 20. The control circuit 11 transmits the zero-adjustment indication command to the control circuit 21 via the first interface circuit 13 (S401). The control circuit 21 resets the scale data to "0" on the basis of the zero-adjustment indication command (S402). The control circuit 21 transmits this piece of scale data as response data back to the control circuit 11 (S403). The control circuit 11 receives the scale data transmitted from the control circuit 21 via the first interface circuit 13. The control circuit 11 visibly displays the received scale data on the scale-oriented display 3 through the first interface circuit 13 (S404). As a result, "0 gram" is displayed on the display 3.

The control circuit 11 thus automatically executes the zero-adjustment in the scaling unit 20 each time a series of scaling processes are completed, whereby the processing returns to S304 in the first scaling process, and the next goods 4 can be scaled in sequence. Note that if some sort of abnormality occurs when performing the zero-adjustment in S402, the control circuit 11, based on the response data transmitted from the control circuit 21, judges a state of abnormality, then displays this state on the display 3, and executes a process in the event of the abnormal state.

(Selection of Processing Function)

The first and second scaling processes described above are executed in the bar code reader having such a geometry that the control button (serving as the start button and the tine adjusting button) 122 and the zero-adjustment button 123 are individually disposed on the operation/display panel 12 of the scanner function unit 1. As will be explained next, however, a variety of processing functions of the bar code reader, to be specific, the scaling process (including the bar code reading/demodulating process), the wake-up process (including the loudspeaker sound adjusting process) and the zero-adjusting process in the scaling unit, can be also selectively executed based on the operating method of the same button (switch).

Figure 5:
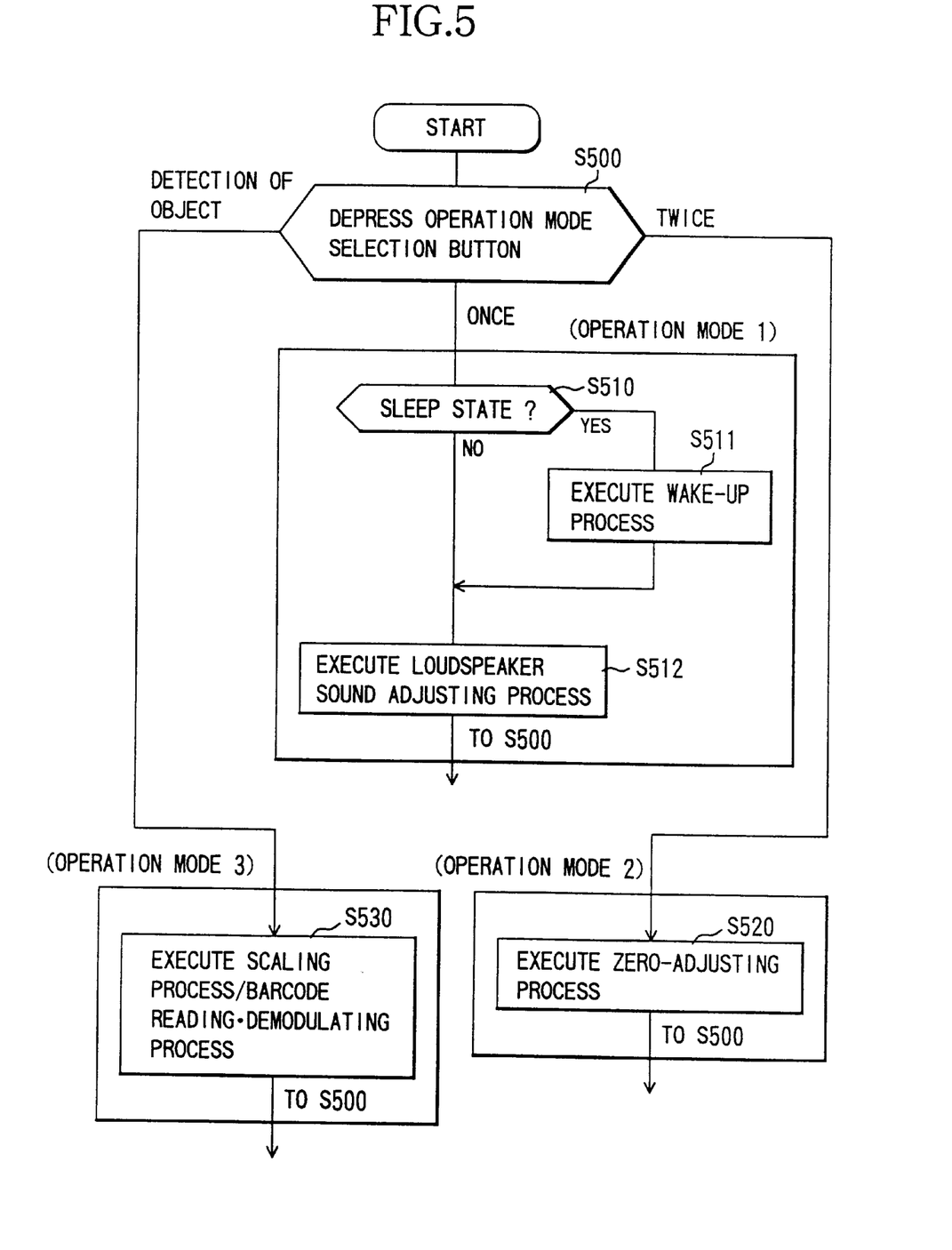
FIG. 5 is a flowchart showing a selection implementing step in a processing function in one embodiment of the present invention.

Referring to FIGS. 1, 2 and 5 in combination, the control button (serving as the start button and the tone adjusting button) 122 and the zero-adjustment button 123 of the operation/display panel 12 of the scanner function unit 1, are physically integrated into one piece of operation mode selection button 126 for selecting the processing function. An illustration in this integrated state is, however, omitted in FIG. 2. When the operator switches ON the power supply of the bar code reader, the control unit 11 of the scanner function unit 1 enters a selective step of the processing function in S500 shown in FIG. 5. When the operator depresses once the operation mode selection button 126 of the operation/display panel 12, the control circuit 11 detects this operation state, and executes the wake-up process and the loudspeaker sound adjusting process (an operation mode 1).

In this operation mode 1, the control circuit 11, to begin with, judges whether or not each circuit is in an operable state, i.e., whether in a sleep state or not (S510). For this judgement, the control circuit 11 refers to a set status of a flag of the RAM memory circuit (not shown). The control circuit 11 sets this flag to "1" when in the sleep state and to "0" when not in the sleep state. The control circuit 11, if there is no operation for a predetermined time (e.g., 30 min) measured by a timer, sets the flag to "1". The control circuit 11, when judging in S510 that each circuit is in the sleep state, executes the wake-up process for each circuit, including motor start-up control of the optical system circuit 10 (S511). The control circuit 11, when in this wake-up process, sets the flag in the RAM memory circuit to "0", and executes the next loudspeaker sound adjusting process.

The control circuit 11, when judging in 3510 that each circuit is not in the sleep state or after completing the wake-up process in S511, executes the loudspeaker sound adjusting process in S512. In this loudspeaker sound adjusting process, the control circuit 11 controls a loudspeaker driving circuit (not shown) of the operation/display panel 12 so that a volume or a tone set by the operator using the operation mode selection button 126 can be outputted from the loudspeaker 121. Upon an end of the process in S512, the control circuit 11 loops back to the selection step of the processing function in S500, and waits for a next processing request.

Next, when the operator depresses twice the operation mode selection button 126, the control circuit 11 detects an operation state thereof and executes the zero-adjusting process (an operation mode 2) in the scaling unit 20. Step S520 in the zero-adjusting process in the operation mode 2 is the same as what is done in S305—S308 in the first scaling process. Upon finishing the zero-adjusting process, the control circuit 11 returns to the selection step in the processing function in S500, and waits for a next processing request.

Next, the operator does not depress the operation mode selection button 126, and the goods 4 is placed on the scale board 15a or position in the vicinity of the bar code reading windows 15b, 15c, in which case the scaling process and the bar code reading/demodulating process (an operation mode 3) are carried out. In this operation mode 3, the scaling process or the bar code reading/demodulating process (S530) is selectively executed. For this execution, the operator needs to set beforehand a switch button (unillustrated) provided in the host computer 5.

The control circuit 11, when the goods 4 is placed on the scale board 15a when in the scaling process, scales the goods 4 in accordance with the steps in the first or second scaling process described above. Further, the control circuit 11, when the goods 4 passes through the bar code reading windows 15b, 15c during the bar code reading/demodulating process, reads a bright/dark pattern of the reflected laser beams when the bar code 40 is irradiated with the laser beams, then demodulates the character data coded into the bar code 40, and transmits the character data to the host computer 5. Note that Japanese Patent Application Laid- Open No. 9-81663 titled "Bar Code Reader and Bar Code Reading Method" invented by Mitsuo Watanabe, et al. can be referred to for details of the bar code reading/demodulating method, of which the description is therefore omitted herein.

<Modified Example>

On the occasion of selecting the processing functions described above, any one of the plurality of operation modes 1, 2, 3 is selectively processed depending on the number of depressions of the one integrated operation mode selection button 126. As a substitute for this method of how many times the button is depressed, there may taken a method of selectively processing one of the plurality of operation modes 1, 2, 3 depending upon a depressing time. In this case, the control circuit may be provided with a circuit for detecting a depressing time of the operation mode selection button 126 of the operation/display panel 12.

Further, the first and second scaling processes discussed above have been carried out in the bar code reader having the geometry wherein the control button (serving as the start button and the tone adjusting button) 122 and the zero-adjustment button 123 are individually disposed on the operation/display panel 12 of the scanner function unit 1. In the bar code reader taking such a construction that the variety of processing functions, i.e., the scaling process (including the bar code reading/demodulating process), the wake-up process (including the loudspeaker sound adjusting process) and the zero-adjusting process in the scaling unit, are selectively executed based on the difference in terms of the operating method of the same button (switch), however, a state-of-depression detecting step (S304 in FIG. 3) of the zero-adjustment button 123 may be a substitute for the method of detecting the number of depressions or detecting the depressing time of the operation mode selection button 126.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A bar code reader comprising:
    a bar code processing unit for generating a bright/dark pattern containing a plurality of bright areas and a plurality of dark areas forming a bar code by optically scanning a bar code forming surface of an object, converting the bright/dark pattern into plural categories of module values indicating widths of the respective bright areas and widths of the respective dark areas, and demodulating the bar code into character data;
    a scaling unit for creating scale data by scaling a weight of the object;
    a zero-adjustment control unit for working a weight scaling function of said scaling unit to perform zero-setting; and
    a weight change judging unit for judging at least one of an increment change from zero weight when the object is placed onto the scaling unit following the zero-setting and a decrement change from zero weight when the object is taken off the scaling unit following the zero-setting on the basis of the scale data created by said scaling unit, and outputting a corresponding piece of scale data when in the increment change and an absolute value of a corresponding piece of scale data when in the decrement change; and
    a comparison unit for comparing a weight of an object at a first point of time with a weight of the object at a second point of time posterior to the first point of time;
    wherein, if a first object having a first weight and a second object having a different second weight are on the scaling unit and the first object is removed, then the first weight is outputted; and
    whereby, an operator of the scaling unit does not need to re-execute a zero-adjustment after temporarily removing an object.

2. A bar code reader according to claim 1, further comprising:
    an automatic zero-adjustment control unit for forcibly working the weight scaling function of said scaling unit to perform the zero-setting when said weight change judging unit judges the decrement change and outputs the absolute value of the scale data.

3. A bar code reader according to claim 2, wherein a box body of said bar code reader incorporates:
    a first switch element for enabling an operator to input the request for initializing said scaling unit; and
    a second switch element for enabling the operator to start up another processing function containing control for changing any one of a volume and a tone of a confirmation sound emitted from a loudspeaker when said bar code processing unit reads the bar code.

4. A bar code reader according to claim 3, wherein said first switch element and said second switch element are integrated into one same switch element.

5. A bar code reader according to claim 1, wherein a box body of said bar code reader incorporates:
    a first switch element for enabling an operator to input the request for initializing said scaling unit; and
    a second switch element for enabling the operator to start up another processing function containing control for changing any one of a volume and a tone of a confirmation sound emitted from a loudspeaker when said bar code processing unit reads the bar code.

6. A bar code reader according to claim 5, wherein said first switch element and said second switch element are integrated into one same switch element.

7. The bar code reader according to claim 1, comprising:
    a output unit for outputting, when there occurs a decrement change in weight as a result of the comparison, scale data with plus and minus of the change being reversed.

8. The bar code reader according to claim 1, comprising:
    a output unit for outputting, when there occurs a decrement change in weight as a result of the comparison, scale data corresponding to an absolute value of the change.

9. The bar code reader according to claim 1, comprising:
    a setting unit for automatically setting, when there occurs a decrement change in weight as a result of the comparison, the weight of the object at the second point of time to zero.

10. A scaling method comprising:
    creating scale data by scaling a weight of an object by a zero-set scaling device;
    judging at least one of an increment change from zero weight when the object is placed onto the scaling unit following the zero-setting and a decrement change from zero weight when the object is taken off the scaling unit following the zero-setting on the basis of the created scale data;

comparing a weight of the object at a first point of time with a weight of the object at a second point of time posterior to the first point of time;

outputting a corresponding piece of scale data when in the increment change; and outputting an absolute value of a corresponding piece of scale data when in the decrement change;

whereby, if a first object having a first weight and a second object having a different second weight are on the scaling unit and the first object is removed, then the first weight is outputted; and whereby, an operator using the scaling method does not need to re-execute a zero-adjustment after temporarily removing the object.

11. A scaling method according to claim 10, further comprising:

selecting a start-up of a processing function of making said scaling device perform zero-setting, and a start-up of another processing function containing control for changing anyone of a volume and a tone of a confirmation sound emitted from a loudspeaker when reading the bar code, corresponding to a difference between operation methods of one same switch element.

* * * * *